(12) United States Patent
Lloyd-Jones (10) Patent No.: US 7,054,481 B2
(45) Date of Patent: May 30, 2006

(54) AUTOMATIC PERSON META-DATA LABELLER

(75) Inventor: Daniel John Lloyd-Jones, Kambah (AU)

(73) Assignee: Canon Kabushiki Kaisha, Tokyo (JP)

( * ) Notice: Subject to any disclaimer, the term of this patent is extended or adjusted under 35 U.S.C. 154(b) by 694 days.

(21) Appl. No.: 09/915,324

(22) Filed: Jul. 27, 2001

(65) Prior Publication Data

US 2002/0048397 A1    Apr. 25, 2002

(30) Foreign Application Priority Data

Aug. 4, 2000    (AU) .................................. PQ9216

(51) Int. Cl.
    *G06K 9/00*    (2006.01)
(52) U.S. Cl. .................. 382/162; 382/118; 382/164; 382/165
(58) Field of Classification Search ............... 382/103, 382/115–118, 162, 164, 173, 203, 165, 254, 382/260, 298, 300; 348/580; 358/451
See application file for complete search history.

(56) References Cited

U.S. PATENT DOCUMENTS

| | | | | |
|---|---|---|---|---|
| 4,357,624 A | * | 11/1982 | Greenberg | 348/578 |
| 5,159,647 A | * | 10/1992 | Burt | 382/103 |
| 5,331,544 A | * | 7/1994 | Lu et al. | 705/10 |
| 5,699,442 A | * | 12/1997 | Fellinger | 382/103 |
| 5,771,307 A | * | 6/1998 | Lu et al. | 382/116 |
| 5,912,980 A | * | 6/1999 | Hunke | 382/103 |
| 5,937,081 A | * | 8/1999 | O'Brill et al. | 382/111 |
| 6,118,887 A | * | 9/2000 | Cosatto et al. | 382/103 |
| 6,178,262 B1 | * | 1/2001 | Picard et al. | 382/195 |
| 6,205,231 B1 | * | 3/2001 | Isadore-Barreca et al. | 382/103 |
| 6,301,370 B1 | * | 10/2001 | Steffens et al. | 382/103 |
| 6,307,568 B1 | * | 10/2001 | Rom | 345/629 |
| 6,404,426 B1 | * | 6/2002 | Weaver | 345/419 |
| 6,453,052 B1 | * | 9/2002 | Kurokawa et al. | 382/100 |
| 6,526,215 B1 | * | 2/2003 | Hirai et al. | 386/52 |
| 6,583,792 B1 | * | 6/2003 | Agnew | 345/660 |
| 6,608,650 B1 | * | 8/2003 | Torres et al. | 348/333.02 |
| 6,754,389 B1 | * | 6/2004 | Dimitrova et al. | 382/224 |
| 6,879,704 B1 | * | 4/2005 | Nakamura et al. | 382/103 |
| 2002/0046100 A1 | * | 4/2002 | Kinjo | 705/14 |

FOREIGN PATENT DOCUMENTS

WO    WO 94/28490    12/1994

OTHER PUBLICATIONS

Platt, "AutoAlbum: Clustering Digital Photographs Using Probabilistic Model Merging," Proc. IEEE Workshop on Content-based Access of Image and Video Libraries, Jun. 16, 2000, pp. 96-100.*

Official Communication/Examiner's Report regarding Corresponding Australia Patent Application No. 57684/01 (Oct. 18, 2002).

* cited by examiner

*Primary Examiner*—Jingge Wu
*Assistant Examiner*—Yubin Hung
(74) *Attorney, Agent, or Firm*—Fitzpatrick, Cella, Harper & Scinto (57) ABSTRACT

A method 214 of identifying an object in a target image is disclosed, the method comprising steps of selecting 400 a part of the object having a distinctive color, searching 702 the target image for said part, and tagging 704 the target image if said part is found therein.

15 Claims, 8 Drawing Sheets

AUTOMATIC PERSON META-DATA LABELLER

TECHNICAL FIELD OF THE INVENTION

The present invention relates generally to the field of image post-processing and, in particular, to aspects of collation and sorting of images. The present invention relates to a method and apparatus for identifying a designated person in a plurality of images. The invention also relates to a computer program product including a computer readable medium having recorded thereon a computer program for identifying a designated person in a plurality of images.

BACKGROUND ART

The advent of digital photography encourages users of digital cameras to take large numbers of photographs, this deriving, at least in part, from the fact that such photographs do not require traditional development, with its cost and inconvenience. Digital images are, in contrast, available for use almost immediately, once the film diskette is suitably loaded into a personal computer (PC), or suitable display device.

It is, however, time consuming for the photographer to sort and label these voluminous images, and consequently, the sorting and labelling process is often neglected. As a result, the photographer runs a risk of accumulating a growing number of images, many of which are not readily accessed because of the absence of a convenient method of labelling.

Present methods of automatic identification using image processing are still unsatisfactory, and often cannot detect the presence of any person in an image, let alone a specific person. It is possible, for example, to detect the presence of people in a photograph using detection of skin colour via colour histograms, however this technique is non-specific, and relatively inaccurate.

DISCLOSURE OF THE INVENTION

It is an object of the present invention to substantially overcome, or at least ameliorate, one or more disadvantages of existing arrangements.

According to a first aspect of the invention, there is provided a method of identifying the presence of an object in a target image, said method comprising steps of:

selecting a part of said object; said part having a distinctive colour;

searching said target image for said part; and tagging the target image if said part is found therein.

According to another aspect of the present invention, there is provided an apparatus for identifying an object in a target image, said apparatus comprising:

means for selecting a part of said object, said part having a distinctive colour;

means for searching said target image for said part; and means for tagging the target image if said part is found therein.

According to still another aspect of the present invention, there is provided an apparatus for identifying an object in a target image, said apparatus comprising:

a memory for storing a program; and a processor for executing the program, said program comprising:

code for selecting a part of said object, said part having a distinctive colour;

code for searching said target image for said part; and code for tagging the target image if said part is found therein.

According to still another aspect of the present invention, there is provided a computer program which is configured to make a computer execute a procedure to identify an object in a target image, said program comprising:

code for selecting a part of said object, said part having a distinctive colour;

code for searching said target image for said part; and code for tagging the target image if said part is found therein.

According to still another aspect of the present invention, there is provided a computer program product including a computer readable medium having recorded thereon a computer program which is configured to make a computer execute a procedure to identify an object in a target image, said program comprising.

code for selecting a part of said object, said part having a distinctive colour;

code for searching said target image for said part; and code for tagging the target image if said part is found therein.

BRIEF DESCRIPTION OF THE DRAWINGS

A number of preferred embodiments of the present invention will now be described with reference to the drawings, in which.

DETAILED DESCRIPTION INCLUDING BEST MODE

Where reference is made in any one or more of the accompanying drawings to steps and/or features, which have the same reference numerals, those steps and/or features have for the purposes of this description the same function (s) or operation(s), unless the contrary intention appears.

Figure 1:
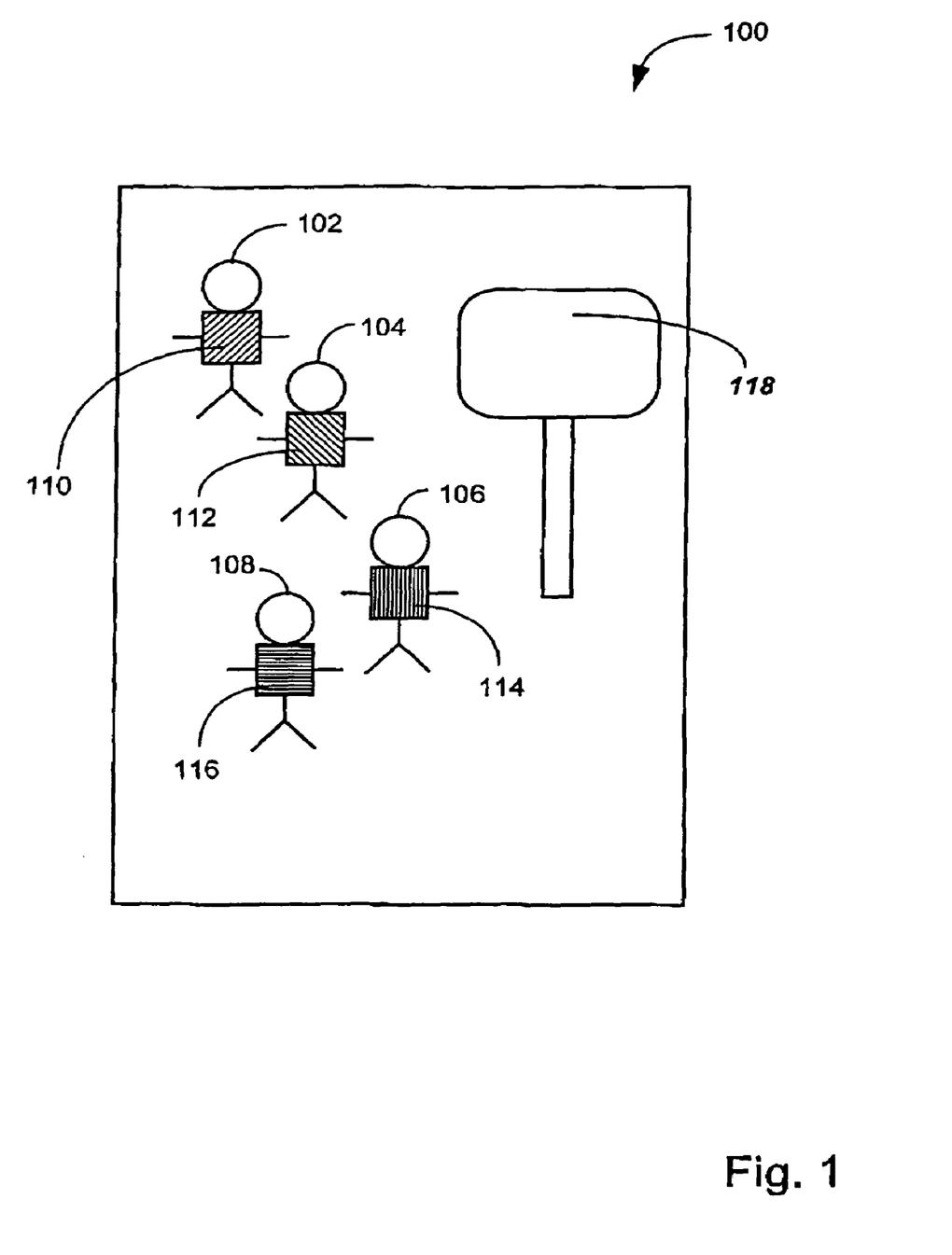
FIG. 1 depicts an illustrative image containing a number of people and other objects.

FIG. 1 shows a "stick-person" representation of a photograph to be processed in accordance with one disclosed arrangement. The photograph 100 depicts a number of people 102–108, and a tree 118. Each person 102 to 108 is wearing various articles of clothing and other fashion accessories, a distinctive fashion accessory or item of clothing for each being depicted as 110 to 116 respectively.

The disclosed arrangement is most effective if a fashion accessory 110 worn by a person 102 has a distinctive colour which is unique, i.e. no one else in the set of photographs is wearing an accessory with the same colour. The disclosed arrangement is, however, still useful, even when the aforementioned condition is not strictly met.

Figure 2:
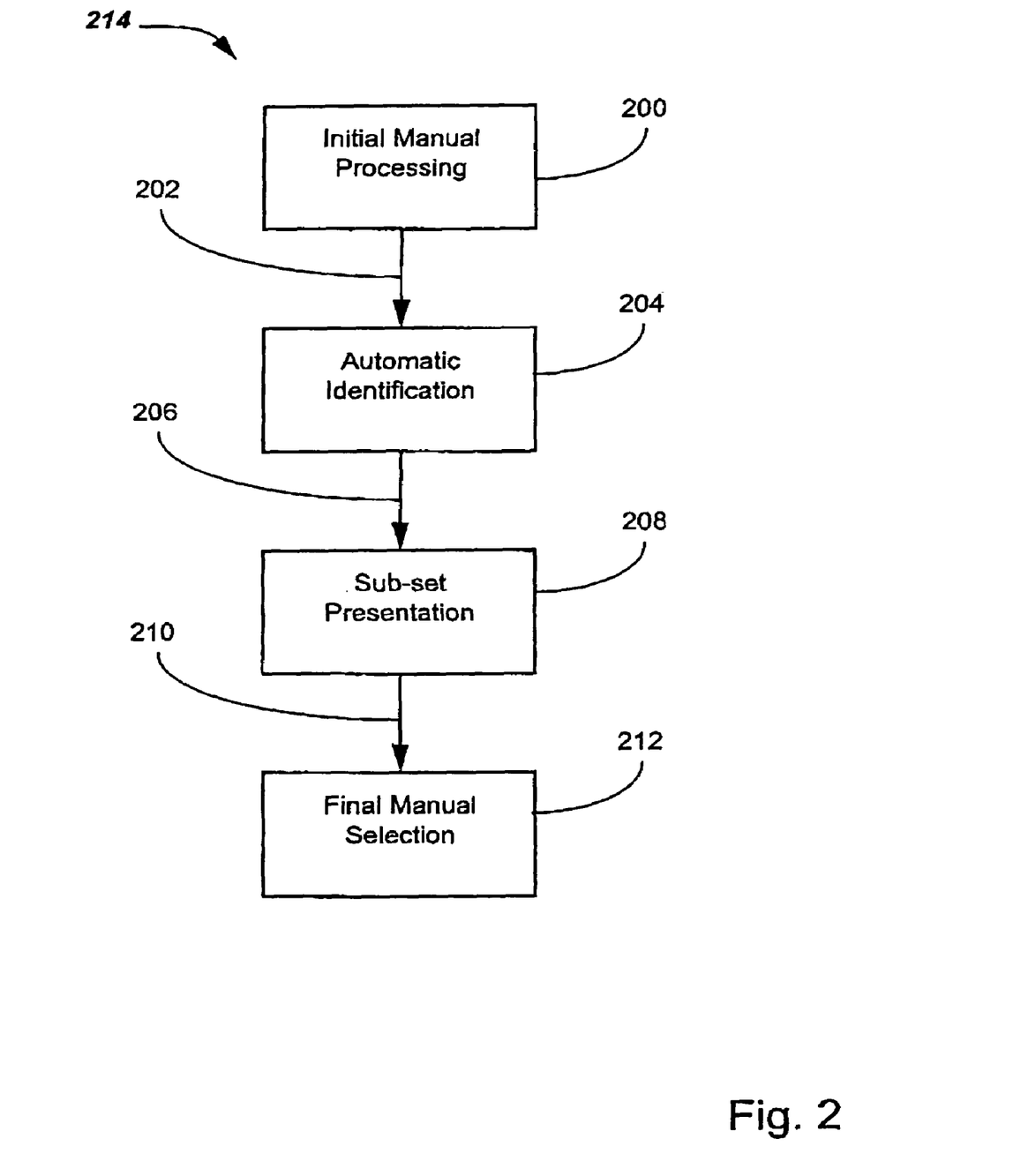
FIG. 2 shows a flow process diagram for a preferred embodiment of the invention.

FIG. 2 shows a flow chart representation of a labelling process 214 according to a disclosed arrangement. The labelling process 214 requires the user to designate, in a step 200, a desired person in an indicative image, whereafter the process 214 automatically identifies the presence of that person in the remaining images under consideration, or in a subset thereof This approach is particularly applicable for automatic labelling of photographs from a particular event, such as a party. In FIG. 2, the labelling process 214 commences with an initial manual processing step 200, after which an automatic identification step 204 is performed. Thereafter, the labelling process 214 presents, to the user, a reduced sub-set of selected images in a step 208. Consequently the user, in a final manual selection step 212, discards any remaining incorrectly identified photographs, thereby arriving at a set of photographs with the desired person 102 being present therein.

The aforementioned arrangement need not be 100% effective in order to be useful, since even a lesser degree of performance nonetheless reduces the amount of final manual processing which the user needs to perform. Incorrect image identification which may be due, for example, to incorrect colour matching, or multiple colour instances (e.g. a couch having the same colour as the selected clothing worn by the desired person), results in false matches, however the user is nonetheless able to consider a reduced sub-set of images in the step 212, and thereby more conveniently remove the incorrectly matched images.

Figure 3:
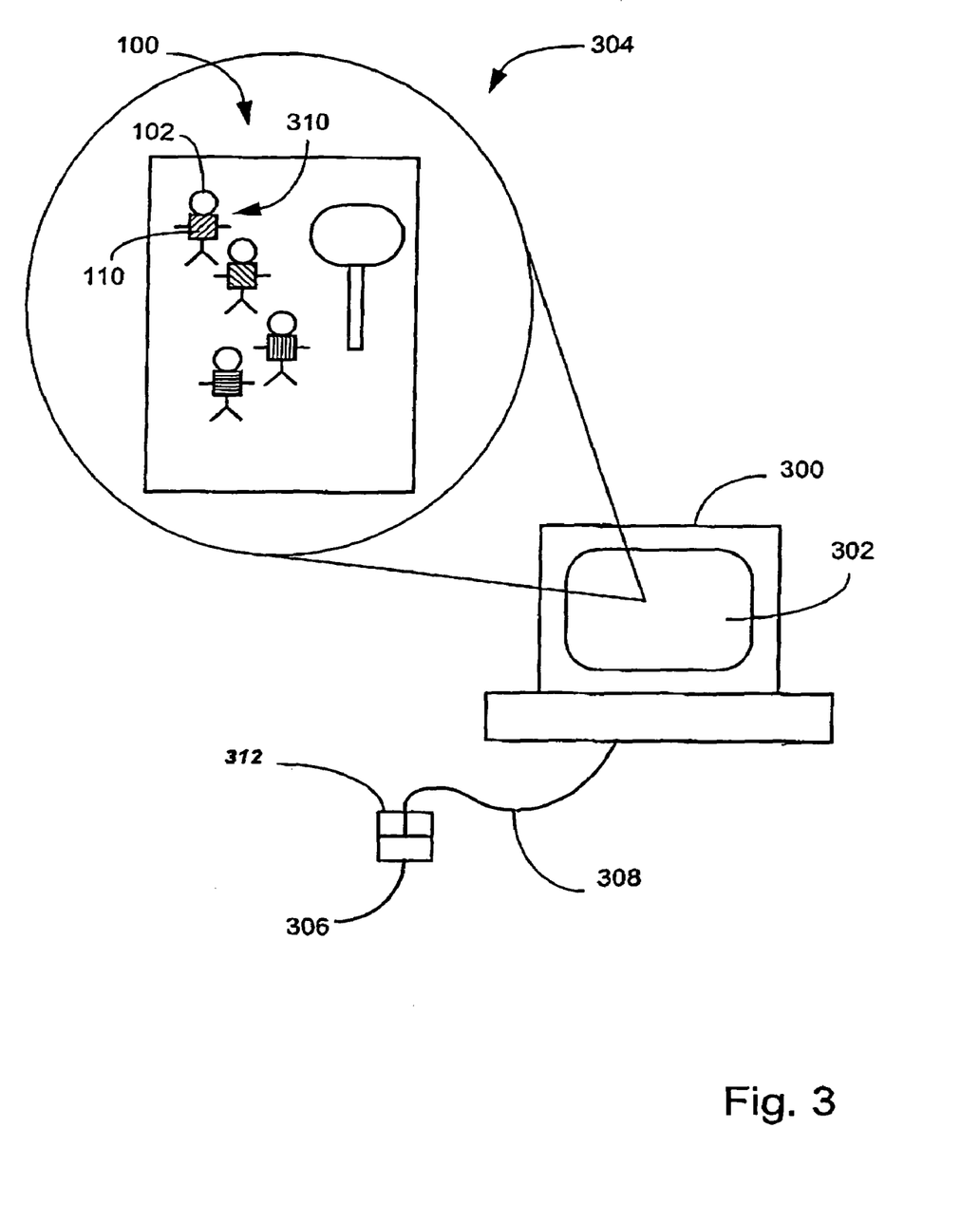
FIG. 3 depicts one method of fashion accessory selection in accordance with the preferred embodiment.

FIG. 3 shows an arrangement by means of which the initial manual selection step 200 described in relation to FIG. 2 is performed. In FIG. 3, the image 100 undergoing the labelling process 214 is shown on a display 302 of a PC 300, the displayed image being shown in more detail in an inset 304. The user makes use of a mouse 306 which is connected to the PC 300 by a connection 308, to point to a particular fashion accessory 110. The action of pointing, depicted by an arrow 310, involves positioning a cursor using the mouse 306, and clicking a mouse button 312. The fashion accessory 110 is discerned by an application running on the PC 300, in a manner described in more detail with reference to FIG. 6. By pointing to the particular fashion accessory 110, the user identifies the key element by which the disclosed arrangement is able to both search for the desired person 102 in the plurality of images being considered, and to label the images in which the desired person 102 is present.

Figure 4:
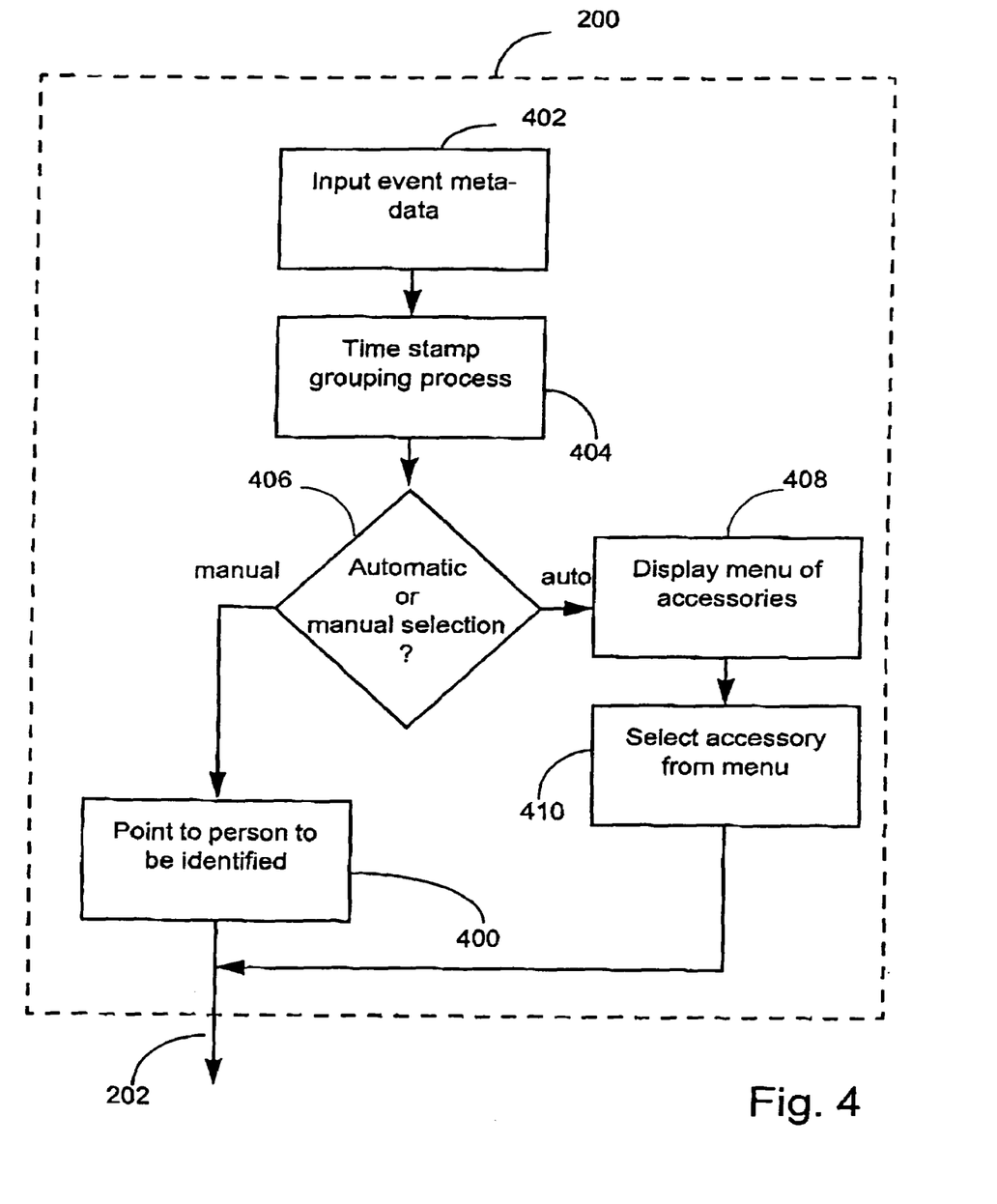
FIG. 4 provides more detail for the initial manual sub-process of FIG. 2.

FIG. 4 depicts the initial manual processing step 200 in more detail.

In a step 402, event meta-data, stored in a memory 806 (see FIG. 8) is utilised, using a processor 805 (see FIG. 8) in order to reduce an image search space to be considered by the automatic identification sub-process 204 (see FIG. 2). The use of meta-data ensures, for example, that only photographs taken during a defined period of time are considered by the labelling process 214, this being based on the hypothesis that it is unlikely that the desired person 102 wears the same fashion accessory 110 all the time. In other words, if the user wishes to identify the presence of the particular person 102 in a large core set of images, the user needs to repeat the labelling process depicted in FIG. 2 for each "event" in the core set of images. For example, if the user has used the digital camera to take photographs of a wedding, a beach party, and a family picnic over the course of a weekend, then the photographer needs to conduct three labelling passes of the image data stored in the camera, in order to identify a particular person who may have been present at all three events. The photographer needs to identify a distinctive fashion accessory for each event. Digital cameras increasingly provide meta-data as part of their normal operation, this being useful in the aforementioned process 402. Although user input, in addition to camera-provided meta-data, can be used to demarcate the boundaries of different events, automatic meta-data provision is preferable.

Whichever basis, i.e. automatic or semi-automatic is used to provide the meta-data in the step 402, a subsequent time-stamp grouping step 404 performs, using the processor 805, analysis of time-stamp meta-data for the photographs. This time-stamp information is used to collect sets of photographs, into groups of images on an event basis. Thereafter, in a decision step 406, a decision is made, by the processor 805, as to whether a manual selection of a particular fashion accessory by the user is required, or alternatively, whether an automatic search based on pre-loaded known accessories is to be used. If a manual selection is to be used, then the process 200 is directed in accordance with a "manual" arrow to a step 400, in which the user points to the distinctive fashion accessory which identifies the desired person as described in relation to FIG. 3. The action of pointing, depicted by the arrow 310, involves positioning a cursor using the mouse 306, and clicking the mouse button 312, thereby selecting the distinctive fashion accessory. If, on the other hand, a more automated search is to be performed, then the process 200 is directed in accordance with an "auto" arrow from the decision step 406 to a step 408 in which a menu of pre-loaded accessory colours, and possibly associated accessory shapes and sizes, is displayed to the user. In a following step 410, the user makes a selection from the menu, thereby defining one of the known accessories to be used to by the automatic identification step 204. Known accessories can include, for example, distinctive team jerseys such as are used in sports games, such jerseys being typically coloured in distinctive bright yellow, green or other colours. A particular advantage provided by the automatic search mode is that once known accessory colours, and perhaps shapes and sizes, have been pre-loaded by the user, and stored in the memory 806 or 809, it is subsequently not necessary for the user to repeatedly provide, or select, sample characteristics upon which the subsequent search process is to be based.

Figure 5:
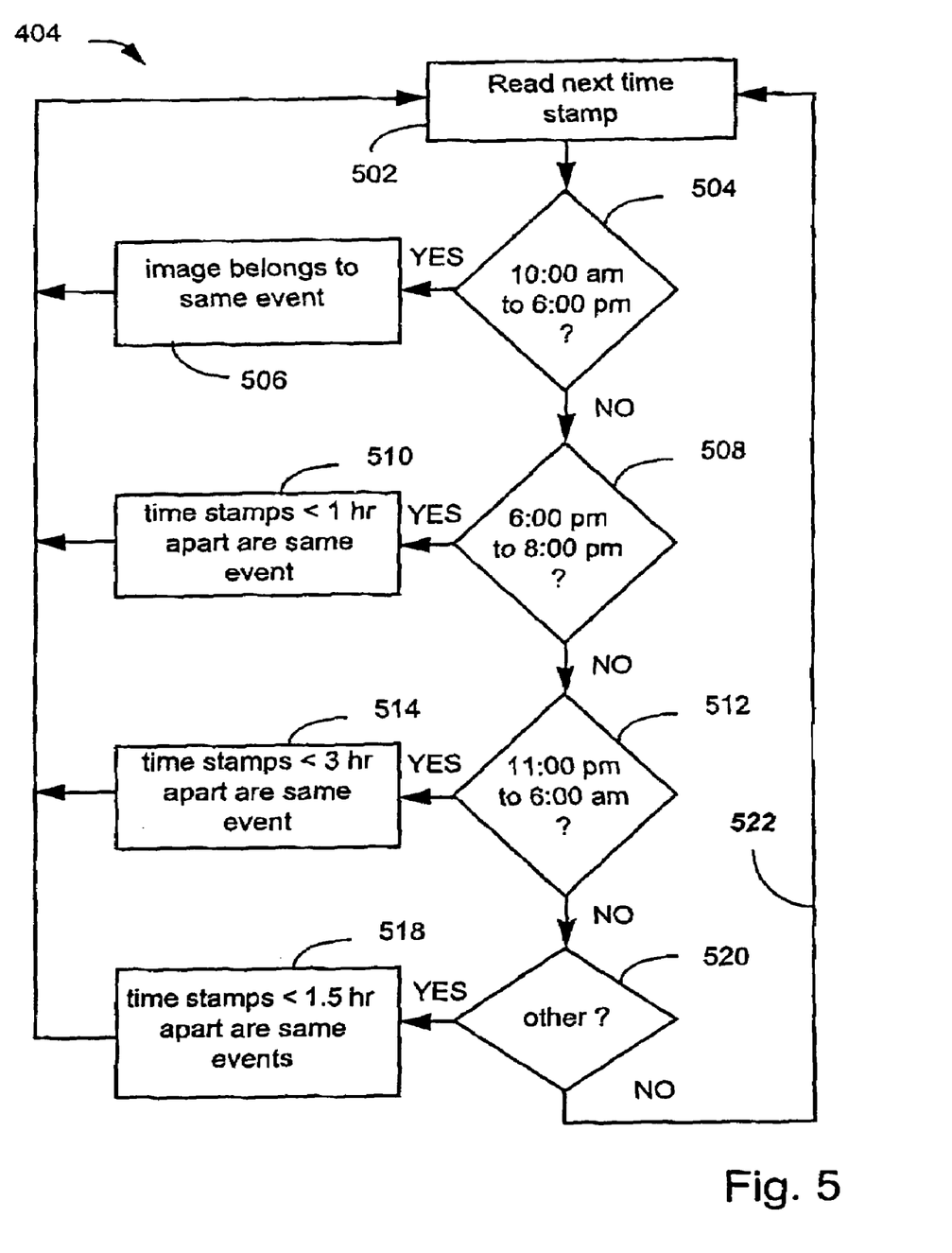
FIG. 5 shows the time-stamp grouping process of FIG. 4 in more detail.

FIG. 5 shows the time-stamp grouping process 404 in more detail, according one disclosed arrangement FIG. 5 shows time-stamp grouping for a particular day, however the process can be extended to perform time-stamp grouping across an arbitrary time period. In a first step 502, a time-stamp of an image, stored in the memory 806 or 809, is read by the processor 805. In a following decision step 504, a check is made as to whether the time stamp falls within a period 10.00am to 6.00pm, which typically forms a normal working day during which time people tend to wear the same set of clothes. If the time-stamp does fall within this period, then the time-stamp process 404 is directed in accordance with a YES arrow to a grouping step 506, which groups all images falling within this time interval into a single "event". Thereafter, the time-stamp process 404 is directed back to the checking step 502 to consider a time-stamp for a next image. If, on the other hand, the present image time-stamp does not fall into the aforementioned time interval, the process 404 is directed in accordance with a NO arrow to a following decision step 508, where a time interval from 6.00pm to 8.00pm is considered, this being a "post work" to "pre-evening activity" time interval, during which people usually tend to change their clothes.

During this time interval, people typically go home from their places of employment, and may change clothes once or twice, before commencing evening activities. Accordingly, allowance is made for a number of different events during this time period, these events spanning, say, a period of one hour each. If an image time-stamp falls within one of these periods, the time-stamp process 404 is directed to a grouping step 510, where time stamps, and associated images, occurring within a time interval of less than one hour duration are defined as belonging to the same event. Thereafter, the time-stamp process 404 is directed back to the checking step 502 for a next image. If, however, the time-stamp of the image being considered does not fall into the aforementioned time periods, the time-stamp process 404 is directed in accordance with the NO arrow to a decision block 512, which considers a late night time interval extending between 11.00pm and 6.00am. This time interval generally relates either to sleep, or to late night party activities. In both cases, people tend to wear the same set of clothing, or if they do change clothes say after a party, a three hour time interval is likely to capture most photographs, belonging to a single event. Accordingly, if a time-stamp of the photograph in question falls within this time period (i.e. 11pm to 6am), the time-stamp process 404 is directed to a grouping step 514, where images whose time-stamps fall within a period of less than three hours are grouped into the same event. Thereafter the time-stamp process 404 is directed back to the checking step 502. If an image time-stamp does not, however, fall into this time period, then the time-stamp process 404 is directed in accordance with a "NO" arrow to a final decision block 520, which considers all time periods not already accounted for in the previous decision blocks 504, 508 and 512. A time-stamp grouping period of 1½ hours is considered, in a grouping step 518, to constitute an event in this case, whereafter the time-stamp process 404 is directed from the grouping step 518 back to the checking step 502, If the time-stamp of the photograph in question corresponds to a different day to the one being considered, the time-stamp process 404 is directed accordingly to a NO arrow 522 back to the checking step 502. It will be apparent, that the aforementioned time-stamp process can be augmented, and/or amended, in order to extend the use of meta-data for grouping images into events. Furthermore, user interaction is also possible, without altering the fundamental feature of grouping images into events, in order to allow use of disclosed arrangement. It will be further apparent, that grouping of images into events can be performed using other methods. Thus, for example, meta-data can be grouped using cluster analysis applied to a frequency with which photographs are taken over a given time period.

Figure 6:
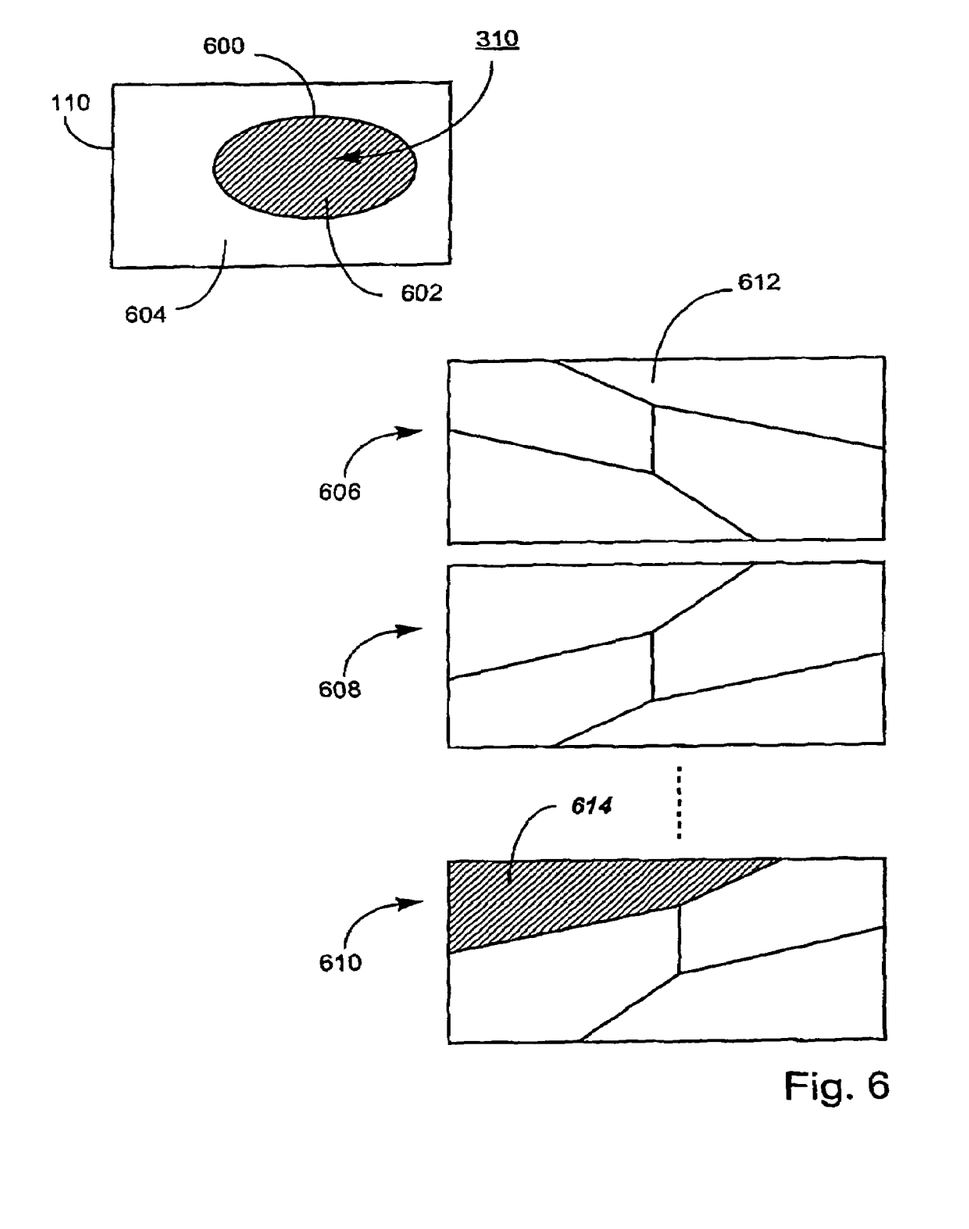
FIG. 6 depicts a seed/region growing technique in accordance with the preferred embodiment.

FIG. 6 shows a seed/region growing technique (also called a colour segmentation technique) used in the automatic identification step 204 of FIG. 2. This technique is used to designate a colour area which forms the identifying attribute of the desired person being searched for, across the set of images by the processor 805. It is also used to reduce the computational requirements for comparison of images. It will be recalled from the description given in relation to FIG. 3, that in a "manual selection" arrangement, as described subsequently in relation to FIG. 4, the photographer pointed to a distinctive fashion accessory 110 in the indicative image 100. The aforementioned pointing is depicted in FIG. 6 by the arrow 310 pointing into the center of the oval shaded area 600, which in the present example, forms a part of the fashion accessory 110 which has a particular distinctive colour 602. Taking a practical example, if the shaded area 600 is a shirt worn by Bob, and on the assumption that Bob is to be identified in the set of images under consideration, then the photographer points into the center of the "shirt" 600, as depicted by the arrow 310. In the alternate "automatic selection" arrangement, as described in relation to FIG. 4, the distinctive colour 602 is provided as a result of the user selection from the menu of known accessory colours (see step 410 in FIG. 4) the pre-loaded attributes being stored in the memory 806 or 809. While the action of pointing and clicking using the mouse (see the description in relation to FIG. 3) or alternately, the process of user selection from the menu of pre-loaded accessories, may be sufficient to identify the fashion accessory 110, a seed/region growing technique is used in one arrangement in order to "fill" the oval shaded area 600. In the present example, when the photographer thus clicks on Bobs shirt, and assuming that the shirt is red, the photographer will notice on the display 302, that a red colour emanates from the clicked cursor and "fills" Bob's shirt. This provides a visual feedback to the photographer that the desired fashion accessory, and the appropriate colour, has in fact been selected. Application of colour segmentation to the selected fashion accessory avoids a problem which might otherwise arise if, for example, the particular pixel selected by the mouse point-and-click happens to be of a different colour, which is speckled in small quantities throughout the shirt. Seed/region growing techniques are available for identifying a region having substantially a uniform colour, these techniques being based on selection of a seed pixel of the specified colour and subsequent comparison thereof to neighbouring pixels. Growing techniques utilize a principle whereby a coordinate, in colour spaces associated with a neighbouring pixel is tested against a corresponding coordinate of the "reference" pixel which has been pointed to, and a distance between the two points in colour space is used as a criterion for deciding whether the two pixels are substantially of the same colour. The use of LAB colour space is recommended, in contrast for example to a Red, Green, Blue (RGB) colour space, since the LAB space provides a more linear relationship when calculating distances between pixel coordinates in colour space. In particular, a criterion used in relation to LAB colour space for determining a similarity between pixels is described mathematically as follows:

$$\sqrt{(L_2-L_1)^2+(A_2-A_1)^2+(B_2-B_1)^2} \leq 1 \qquad [1]$$

where "1" subscripts indicate colour coordinates for the reference pixel, and "2" subscripts represent colour coordinates for a pixel being tested. Equation [1] indicates that if a Euclidean distance between coordinates of the two pixels being considered is less than or equal to one, then the colour of the two pixels is considered to be the same.

Once a reference colour region 602 is defined for the selected accessory 110 of the indicative image 100 using the seed growing technique, the same technique is applied to each of the plurality of images of interest in the event, i.e. 606, 608 . . . 610 where these images 606, 608, 610 constitute a set of images which have been grouped according to the time-stamp grouping process 404 (see FIGS. 4 and 5). It is noted, however, that whereas in the present arrangement the colour segmentation (i.e. the seed/region growing techniques) is applied to the indicative image by the user pointing a mouse, the technique is then automatically applied to each of the plurality of images, without requiring user intervention. Automatic colour segmentation can be performed, for example, by placing seeds in different locations of an image, growing regions around the seeds, placing further seeds where required if the segmentation process "misses" certain regions, and continuing in this manner until the entire image is segmented. After the application of the seed/region growing technique, the image 606 comprises a number of different regions, eg. 612, and similarly, images 608 and 610 comprise a number of different regions. Application of the seed/region growing technique transforms images which typically have a very large number of different colours to images with a significantly reduced number of colour regions, typically 12 to 15. These "distinct colours" are used in a comparison or searching step 702 (see FIG. 7), performed by the processor 805, when searching for the designated fashion accessory. FIG. 6 shows that the image 610 contains a region 614 which has the same colour as the region 600, this being depicted by use of the same crosshatching pattern for the regions 614 and 600.

Figure 7:
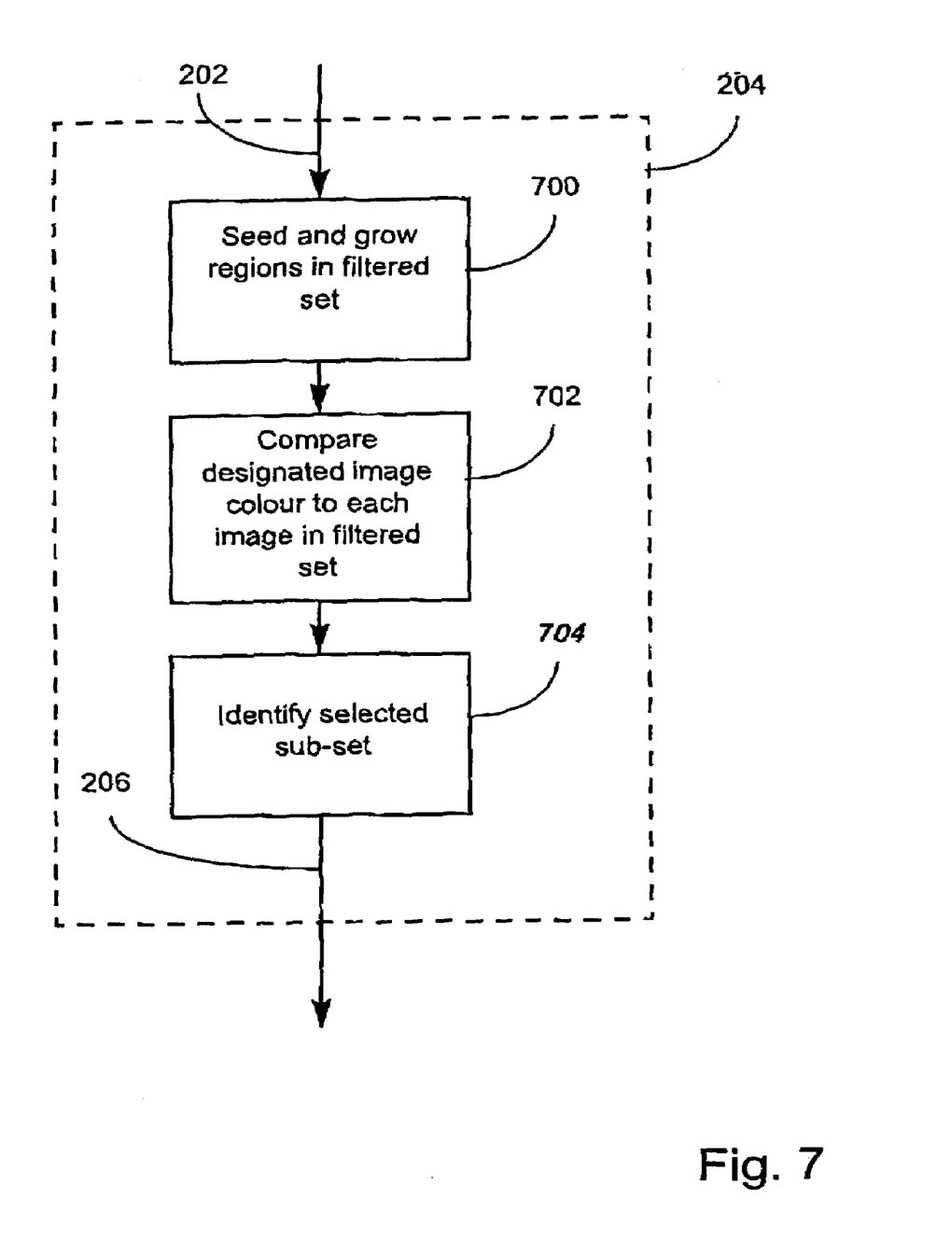
FIG. 7 shows the automatic identification step discussed in relation to FIG. 2 in more detail.

FIG. 7 shows the automatic identification step 204, which is performed by the processor 805, and discussed in relation to FIG. 2 in more detail. In a step 700, and considering a single event, colour regions in each of the images of the selected set are subjected to the seed/region growing technique as previously described in relation to FIG. 6. The indicative image 100 selected by the user in the pointing step 400 (see FIG. 4) is also subjected to the seed/region growing process. In a following step 702, the selected region 600 in the designated image is compared, using the processor 805, with each of the regions eg. 612 in the other images in the set. Thereafter, in a step 704, an image 610 in the event set which has a region of the same colour, i.e. 614, is categorised or tagged as containing the desired fashion accessory, and accordingly, as possibly containing the desired person. From a practical perspective, the image 610 is labelled as containing the desired fashion accessory, and accordingly, as containing the desired person whose presence is being sought. As noted, application of the seed/region growing technique to typical consumer photographs produces processed images having, typically, fifteen or so different colour regions One advantage of using the seed/region growing technique as a precursor to performing colour comparisons, for example using the LAB Euclidean distance measure described in Equation [1], is that the number of regions to be compared is reduced to a tractable level. This allows for rapid and convenient processing, by the processor 805, in contrast to the situation which would prevail if images were compared on a pixel by pixel basis, which would require a number of computations of a different, and greater, order than that proposed in the disclosed arrangement. In effect, the seed/region growing technique transforms images associated with the particular event into images containing only "distinct" colour regions. The original photographs are, of course, retained in the memory 806 or 809, and the "transformed" image only maintained temporarily for use in the automatic identification step 204 (see FIG. 2). Accordingly, the "transformed" image is typically determined as part of the automatic identification process, and is not, in general, stored for later use. If, however, the user wishes to search the set of photographs for a different person, for example, then the transformed images may advantageously be stored, in the memory 806 or 809, for use in that search, rather than again needing to perform the transformation using the processor 805.

Although the previous description described colour comparisons using a Euclidean distance applied to LAB colour space, the comparison can be performed in other ways. For example, fuzzy logic can be used to compensate for subtle differences between images due to differences in lighting and colour conditions. Furthermore; other factors such as size and shape of colour regions can also be incorporated into the comparison step 702. In this latter case, a larger region of colour would have a higher confidence of being a correct match when compared to a reference colour region, than would a colour region of only a few pixels in size. Furthermore, selection of multiple colour reference regions can be used, making use of the same basic mechanism as previously described with reference to a single colour area. This can be arranged, for instance, by selecting a dominant colour target, in addition to one or more secondary colour targets, whose presence is not required for initial matching process, but which can be used as secondary indicators of a correct match.

The aforementioned automatic identification sub-process 204 can be refined by inclusion of skin colour detection as an additional consideration. The use of skin colour detection in conjunction with colour detection using the specified colour of the selected fashion accessory 110 will typically improve the accuracy of the embodiment, since this ensures that a photograph actually contains a person, as well as the identified colour, since the particular colour selected may also, in a given image, attach to a couch.

The aforementioned arrangements are most effective when applied in relation to images taken at a single event such as a party. In such a case, people are, generally, wearing the same clothes and fashion accessories for the duration of the event, and hence the entire set of images can be searched using the same set of defined fashion accessories. Furthermore, the arrangements are most effective when people are wearing distinctive clothes, since this makes the automatic identification sub-process 204 more effective.

One approach to improving the effectiveness of the aforementioned arrangement is to provide people at an event with a small colour sticker, or label, having a distinct and unique colour for each person. This would improve the effectiveness of the described arrangement, and the sticker could be removed by automatic post-processing from the final images.

Figure 8:
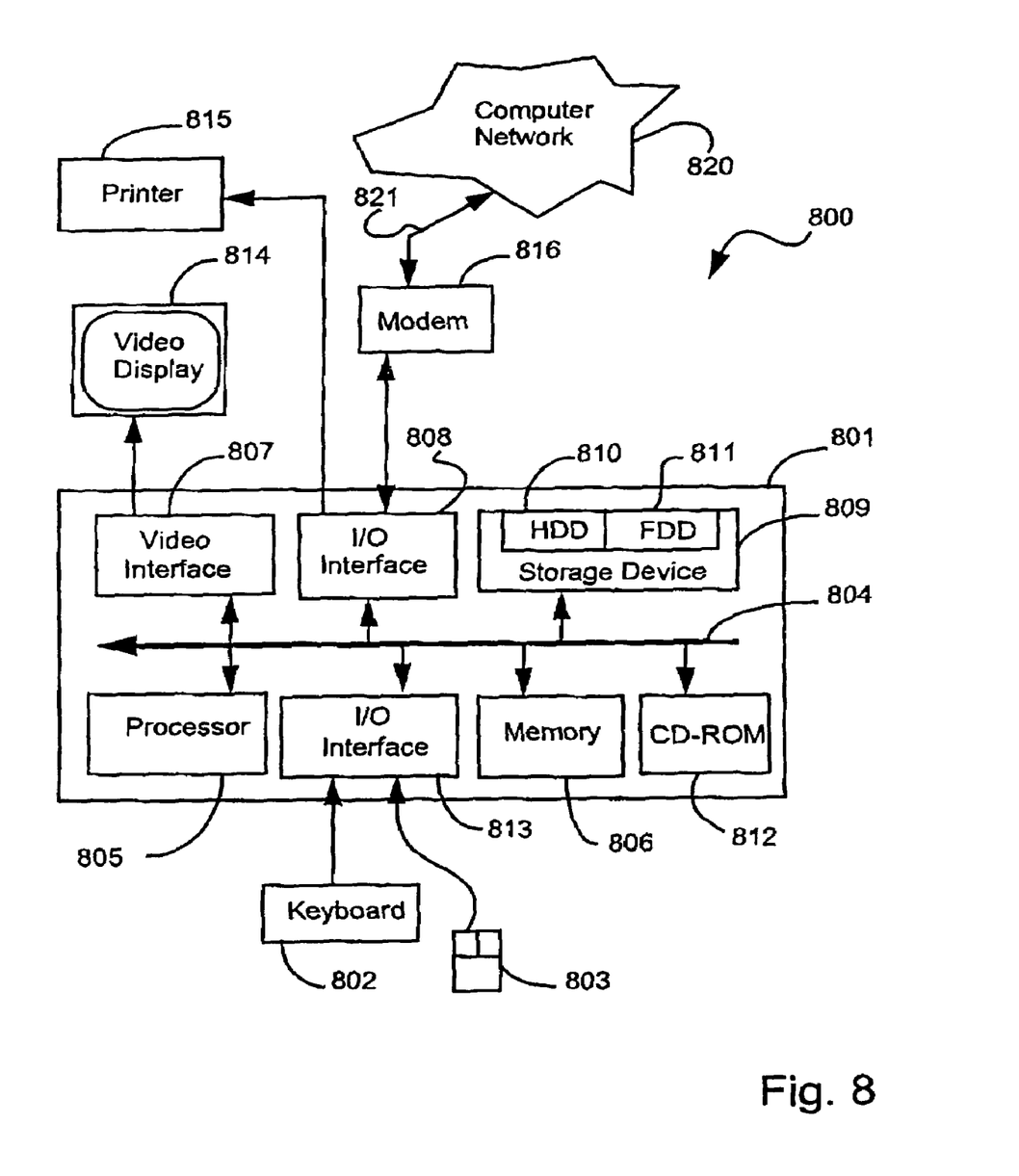
FIG. 8 is a schematic block diagram of a general purpose computer upon which the preferred embodiment of the present invention can be practiced.

Turning to FIG. 8, the method of FIGS. 2, 4 5, and 7 are preferably practiced using a conventional general-purpose computer system 800, such as that shown in FIG. 8 wherein the processes of FIGS. 2, 4, 5 and 7 can be implemented as software, such as an application program executing within the computer system 800. In particular, the steps of identifying a person in one or more images are effected by instructions in the software that are carried out by the computer. The software can be divided into two separate parts, one part for carrying out the method of identifying a person in one or more images, and another part to manage the user interface between the former and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for identifying a person in one or more images in accordance with the disclosed arrangements.

The computer system 800 comprises a computer module 801, input devices such as a keyboard 802 and mouse 803, output devices including a printer 815 and a display device 814. A Modulator-Demodulator (Modem) transceiver device 816 is used by the computer module 801 for communicating to and from a communications network 820, for example connectable via a telephone line 821 or other functional medium. The modem 816 can be used to obtain access to the Internet, and other network systems, such as a Local Area Network (LAN) or a Wide Area Network (WAN).

The computer module 801 typically includes at least one processor unit 805, a memory unit 806, for example formed from semiconductor random access memory (RAM) and read only memory (ROM), input/output (I/O) interfaces including a video interface 807, and an I/O interface 813 for the keyboard 802 and mouse 803 and optionally a joystick (not illustrated), and an interface 808 for the modem 816. A storage device 809 is provided and typically includes a hard disk drive 810 and a floppy disk drive 811. A magnetic tape drive (not illustrated) can also be used. A CD-ROM drive 812 is typically provided as a non-volatile source of data. The components 805 to 813 of the computer module 801, typically communicate via an interconnected bus 804 and in a manner which results in a conventional mode of operation of the computer system 800 known to those in the relevant art. Examples of computers on which the embodiments can be practised include EBM-PC's and compatibles, Sun Sparcstations or alike computer systems evolved therefrom.

Typically, the application program of the disclosed arrangement is resident on the hard disk drive 810 and read and controlled in its execution by the processor 805. Intermediate storage of the program and any data fetched from the network 820 can be accomplished using the semiconductor memory 806, possibly in concert with the hard disk drive 810. In some instances, the application program can be supplied to the user encoded on a CD-ROM or floppy disk and read via the corresponding drive 812 or 811, or alternatively can be read by the user from the network 820 via the modem device 816. Still further, the software can also be loaded into the computer system 800 from other computer readable medium including magnetic tape, a ROM or integrated circuit, a magneto-optical disk, a radio or infra-red transmission channel between the computer module 801 and another device, a computer readable card such as a PCMCIA card, and the Internet and Intranets including email transmissions and information recorded on websites and the like. The foregoing is merely exemplary of relevant computer readable mediums. Other computer readable mediums can be practiced without departing from the scope and spirit of the invention.

The method of identifying a person in one or more images can alternatively be implemented in dedicated hardware such as one or more integrated circuits performing the functions or sub functions of identifying a person in one or more images. Such dedicated hardware can include graphic processors, digital signal processors, or one or more microprocessors and associated memories.

INDUSTRIAL APPLICABILITY

It is apparent from the above that the embodiment(s) of the invention are applicable to the image processing, consumer and professional photography industries.

The foregoing describes only some embodiments of the present invention, and modifications and/or changes can be made thereto without departing from the scope and spirit of the invention, the arrangements being illustrative and not restrictive. Thus, for example, although the description has been couched in terms of identifying a person in one or more images, the arrangements are equally applicable to identifying a particular object in the one or more images, where the particular object has component parts which have distinctive colours, shapes, sizes and so on.

The invention claimed is:

1. A method of identifying, from a set of images, images in which a specified person is present, the method comprising the steps of:

choosing, from the set of images, an indicative image in which the specified person is present;

manually designating an accessory worn by the specified person in the indicative image;

establishing for each image in the set of images a corresponding color segmented image having regions of uniform color, wherein the number of said regions is less than the number of colors in said image;

determining for each image in the set whether the color of the designated accessory in the indicative image matches at least one color region of the corresponding color segmented image; and tagging the images in the set whose corresponding color segmented images contain a region whose color matches the color of the designated accessory in the indicative image.

2. A method according to claim 1, wherein said method further comprises the step of defining the accessory as an item in a menu prior to said manual designation step, and wherein said manual designation step comprises manually designating the accessory in the menu.

3. A method according to claim 1, wherein:

said manual designation step comprises an additional sub-step of manually designating another accessory worn by the specified person in the indicative image, wherein the other accessory has another color;

said determining step further comprises the step of determining for each image in the set whether the color of the another accessory in the indicative image matches at least another color region of the corresponding color segmented image; and said tagging step comprises the step of tagging images in the set whose corresponding color segmented images contain both a region whose color matches the color of the designated accessory and another region whose color matches the another color.

4. A method according to claim 1, further comprising, prior to said choosing step, additional steps of:

deriving meta-data for a core set of images;

grouping the core set into one or more event image sets dependent upon the meta-data; and choosing the set of images from the one or more event image sets.

5. A method according to claim 4, wherein the meta-data comprises time stamps associated with the images in the core set, and said grouping step comprises, in relation to an image in the core set, a sub-step of:

assigning the image to an event image set if an associated time stamp falls within a predetermined event time interval.

6. A method according to claim 4, wherein said meta-data comprises time stamps for the images in the core set, and said grouping step comprises, in relation to an image in the core set of images, a sub-step of:

assigning the image to an event image set if an associated time stamp can be clustered with time stamps associated with other images in the event image set.

7. A method according to claim 1, wherein:

(1) the accessory manually designated in the indicative image, in addition to its color, has at least one of a distinctive size attribute and a distinctive shape attribute;

(2) said determining step comprises at least further substeps of:
  (a) determining whether a size of a region of the corresponding color segmented image matches the distinctive size; and
  (b) determining whether a shape of a region of the corresponding color segmented image matches the distinctive shape; and
(3) said tagging step comprises tagging the images in the set whose corresponding color segmented images contain a region whose color matches the color of the designated accessory in the indicative image, wherein said region also has at least one of:
  (a) a shape that matches the shape of the designated accessory in the indicative image; and
  (b) a size that matches the size of the designated accessory in the indicative image.

8. An apparatus for identifying, from a set of images, images in which a specified person is present, said apparatus comprising:
  means for choosing, from the set of images, an indicative image in which the specified person is present;
  means for permitting manual designation of an accessory worn by the specified person in the indicative image;
  means for establishing for each image in the set of images a corresponding color segmented image having regions of uniform color, wherein the number of said regions is less than the number of colors in said image;
  means for determining for each image in the set whether the color of the designated accessory in the indicative image matches at least one color region of the corresponding color segmented image; and
  means for tagging the images in the set whose corresponding color segmented images contain a region whose color matches the color of the designated accessory in the indicative image.

9. An apparatus according to claim 8, further comprising:
  means for defining the accessory as an item in a menu; and
  means for permitting manual designation of the accessory from the menu.

10. An apparatus according to claim 8, further comprising:
  means for deriving meta-data for a core set of images;
  means for grouping the core set into one or more event image sets dependent upon the meta-data; and
  means for choosing the set of images from the one or more event image sets.

11. An apparatus for identifying, from a set of images, images in which a specified person is present, said apparatus comprising:
  a memory configured to store a program; and
  a processor configured to execute the program, the program comprising:
    (a) code for choosing, from the set of images, an indicative image in which the specified person is present;
    (b) code for permitting manual designation of an accessory worn by the specified person in the indicative image;
    (c) code for establishing for each image in the set of images a corresponding color segmented image having regions of uniform color, wherein the number of said regions is less than the number of color in said image;
    (d) code for determining for each image in the set whether the color of the designated accessory in the indicative image matches at least one color region of the corresponding color segmented image; and
    (e) code for tagging the images in the set whose corresponding color segmented images contain a region whose color matches the color of the designated accessory in the indicative image.

12. A computer program embodied in a computer-readable medium, which is configured to instruct a computer to execute a procedure for identifying, from a set of images, images in which a specified person is present, said program comprising:
  (a) code for choosing, from the set of images, an indicative image in which the specified person is present;
  (b) code permitting manual designation of an accessory worn by the specified person in the indicative image;
  (c) code for establishing for each image in the set of images a corresponding color segmented image having regions of uniform color, wherein the number of said regions is less than the number of colors in said image;
  (d) code for determining for each image in the set whether the color of the designated accessory in the indicative image matches at least one color region of the corresponding color segmented image; and
  (e) code for tagging the images in the set whose corresponding color segmented images contain a region whose color matches the color of the designated accessory in the indicative image.

13. A computer program embodied in a computer-readable medium, according to claim 12, further comprising:
  code for defining the accessory as an item in a menu; and
  code for permitting manual designation of the accessory from the menu.

14. A computer program embodied in a computer-readable medium, according to claim 12, further comprising:
  code for deriving meta-data for a core set of images;
  code for grouping the core set into one or more event image sets dependent upon the meta-data; and
  code for choosing a desired image set, comprising an indicative image and at least one target image, from the one or more event image sets.

15. A computer program product including a computer readable medium having recorded thereon a computer program which is configured to instruct a computer to execute a procedure for identifying, from a set of images, images in which a specified person is present, the program comprising:
  code for choosing, from the set of images, an indicative image in which the specified person is present;
  code for permitting manual designation of an accessory worn by the person in the indicative image;
  code for establishing for each image in the set of images a corresponding color segmented image having regions of uniform color, wherein the number of said regions is less than the number of colors in said image;
  code for determining for each image in the set whether the color of the designated accessory in the indicative image matches at least one color region of the corresponding color segmented image; and
  code for tagging the images in the set whose corresponding color segmented images contain a region whose color matches the color of the designated accessory in the indicative image.

* * * * *

UNITED STATES PATENT AND TRADEMARK OFFICE
CERTIFICATE OF CORRECTION

PATENT NO. : 7,054,481 B2
APPLICATION NO. : 09/915324
DATED : May 30, 2006
INVENTOR(S) : Daniel John Lloyd-Jones It is certified that error appears in the above-identified patent and that said Letters Patent is hereby corrected as shown below:

SHEET NO. 5 of 8:
Figure 5, "events" should read --event--.

COLUMN 2:
Line 18, "comprising." should read --comprising:--.

COLUMN 3:
Line 9, "thereof" should read --thereof.--.
Line 52, "utilised" should read --utilized--.

COLUMN 4:
Line 48, "arrangement" should read --arrangement.--.

COLUMN 7:
Line 39, "regions" should read --regions.--.

COLUMN 9:
Line 21, "EBM-PC's" should read --IBM-PC's--.

Signed and Sealed this

Third Day of February, 2009

JOHN DOLL
*Acting Director of the United States Patent and Trademark Office*